United States Patent [19]

Gram

[11] 4,210,237
[45] Jul. 1, 1980

[54] SYSTEM FOR TRANSFERRING ARTICLES FROM A CONTINUOUSLY MOVING FEEDING CONVEYOR TO A RECEIVING CONVEYOR

[75] Inventor: Hans Gram, Vojens, Denmark

[73] Assignee: Brødrene Gram A/S, Vojens, Denmark

[21] Appl. No.: 937,588

[22] Filed: Aug. 28, 1978

[30] Foreign Application Priority Data

Sep. 1, 1977 [DK] Denmark ............................ 3892/77

[51] Int. Cl.² .......................................... B65G 47/31
[52] U.S. Cl. .................... 198/425; 198/461; 198/575; 198/812
[58] Field of Search .............. 198/425, 459, 460, 461, 198/462, 464, 466, 571, 575, 577, 812, 424, 468, 431

[56] References Cited

FOREIGN PATENT DOCUMENTS

| | | | |
|---|---|---|---|
| 119449 | 5/1971 | Denmark ................................ | 198/425 |
| 124071 | 1/1973 | Denmark ................................ | 198/425 |

Primary Examiner—James L. Rowland
Attorney, Agent, or Firm—Watson, Cole, Grindle & Watson

[57] ABSTRACT

A method of transferring articles from a continuously moving feeding conveyor to a receiving conveyor whereby a reversing roller device, positioned within the delivery end of the feeding conveyor, is reciprocable with respect to the receiving end of the receiving conveyor in such a way that when the delivery of articles from the feeding conveyor is to be interrupted during a period of time, the velocity of the receiving conveyor is increased approximately simultaneously with the initiation of the forward movement of the reversing roller device but such that the receiving conveyor, during the period of time wherein delivery of articles from the feeding conveyor is interrupted, is moved a distance which is greater than the distance of total forward movement achieved by the reversing roller device, after which the velocity of the receiving conveyor is reduced to its original velocity and the reversing roller device is returned to its starting position.

3 Claims, 3 Drawing Figures

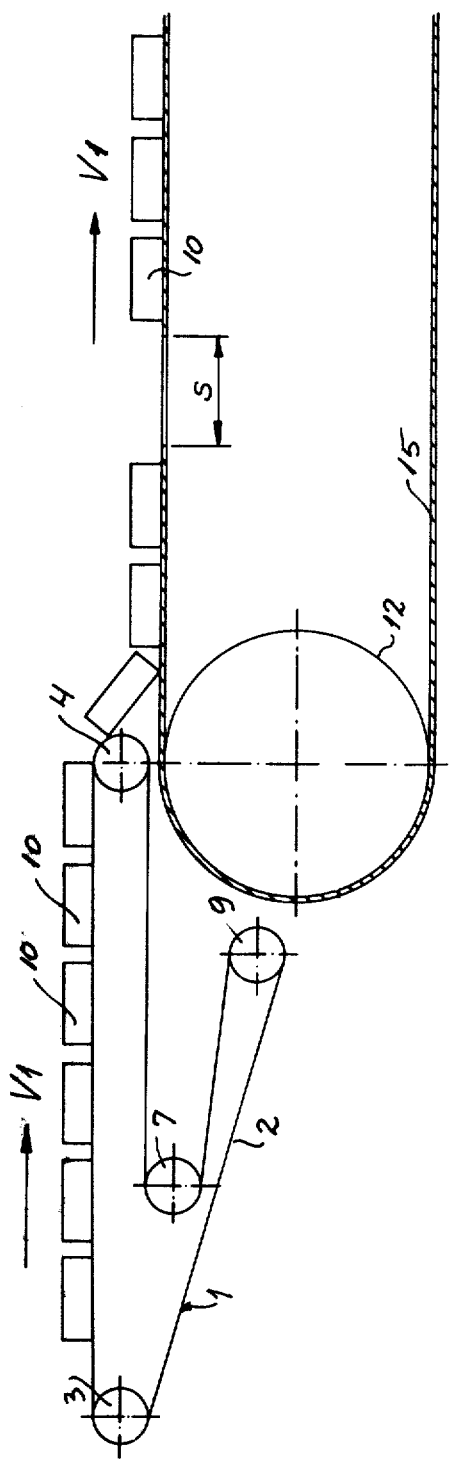

SYSTEM FOR TRANSFERRING ARTICLES FROM A CONTINUOUSLY MOVING FEEDING CONVEYOR TO A RECEIVING CONVEYOR

BACKGROUND OF THE INVENTION

The present invention relates to a system for transferring articles from a continuously moving feeding conveyor to a receiving conveyor of the kind wherein a reversing roller device is used within the delivery end of the feeding conveyor, wherein the reversing roller device is reciprocable with respect to the receiving end of the receiving conveyor, wherein the forward movement of the reversing roller device can be carried out at a velocity which is at least as great as the velocity of the feeding conveyor, such that the delivery of articles from the feeding conveyor is interrupted during a period of time, and wherein the velocity of the receiving conveyor is changeable.

A method of the kind referred to above is known from the disclosure in Danish Pat. No. 124,071. According to this known method, the receiving conveyor is moved intermittently. The receiving conveyor stands still while delivery from the feeding conveyor is carried out and the delivery is carried out while the reversing roller device is being withdrawn. After delivery of a group of articles on the receiving conveyor, the receiving conveyor is moved, and during this movement also the reversing roller device is moved, whereinafter the receiving conveyor is stopped and the reversing roller device is withdrawn, such that a further group of articles is delivered to the receiving conveyor. In order to achieve a reasonable rate of delivery onto the receiving conveyor, it is necessary to move the receiving conveyor fast during the periods during which the receiving conveyor is moved and, moreover, the length of each group of articles delivered is limited by the length of stroke of the reversing roller device and, accordingly, by the overlapping of the feeding conveyor with respect to the receiving conveyor when the reversing roller device is in its maximally extended position.

A method of the kind mentioned above wherein, however, the velocity of the receiving conveyor is constant and higher than the velocity of the feeding conveyor, is known from Danish Patent Specification No. 119,449. Due to the fact that the receiving conveyor according to this particular invention runs constantly, and at a higher velocity than the velocity of the feeding conveyor, articles will be delivered to the receiving conveyor with an increased mutual spacing compared with the mutual spacing of the articles on the feeding conveyor, and such increased spacing is disadvantageous in cases where close positioning of the articles on the receiving conveyor is desired.

The inventor of the present invention has previously invented an apparatus for treating goods wherein the goods are passed through the treatment apparatus upon flexible carriers which are mutually disconnected and are arranged above each other during the treatment in the apparatus but which, when removed from the apparatus, are connected to each other in such a way that the carriers form a generally continuous conveyor band from which the goods treated may be removed and upon which the goods to be treated may be arranged. After the goods have been positioned upon the mutually connected carriers, the carriers are mutually disconnected and are arranged one above the other in the apparatus and moved through the apparatus. In this connection reference is made to the applicant's prior U.S. application Ser. No. 764,235, filed Jan. 31, 1977 (now abandoned) and applicant's U.S. Pat. No. 4,143,758.

The method disclosed in Danish Pat. No. 124,071 is not suitable for feeding the apparatus mentioned above because, in accordance with the teachings in that patent, an overlap between the feeding conveyor and the receiving conveyor at the maximally extended position of the reversing roller device should correspond to the length of the carrier, but due to the very long length of such carriers, such an overlap is technically impossible. Moreover, very high velocities of the receiving conveyor in the periods between the deliveries would be necessary. A method as explained in the disclosure of Danish Pat. No. 119,449 moreover, is not suitable for feeding the apparatus mentioned above because the articles, where using such method, would be deposited upon the connected carriers forming the receiving conveyor with a spacing greater than the spacing of the articles on the feeding conveyor and, accordingly, the capacity of the apparatus mentioned would be reduced.

SUMMARY OF THE INVENTION

The method according to the present invention is characterized by driving the receiving conveyor during a period of time with a first velocity adjusted in such a way, with respect to the velocity of the feeding conveyor, that the articles are delivered to the receiving conveyor with a predetermined mutual spacing, whereafter the velocity of the receiving conveyor is increased approximately simultaneously with the initiation of the forward movement of the reversing roller device, the increased velocity of the receiving conveyor being so much higher than the first velocity that the receiving conveyor, during the period of time wherein delivery of articles from the feeding conveyor is interrupted, is moved a distance which is greater than the total distance of the forward movement carried out by the reversing roller device, the increased velocity simultaneously being higher than the velocity of the forward movement of the reversing roller device, reducing the velocity of the receiving conveyor to the first velocity after the termination of the period of time during which delivery of articles is interrupted, and returning the reversing roller device to the starting position of the device before the next acceleration of the receiving conveyor is carried out. By means of such a method transfer of articles may be carried out while the receiving conveyor moves, and the amount of velocity increase needed to be carried out during the periods during which the delivery is disconnected, may be made comparatively low. Moreover the length of stroke of the reversing roller device may be made short. Furthermore, the velocity of the receiving conveyor may be chosen less than, or so as to correspond with the velocity of the feeding conveyor in such a way that the articles may be arranged upon the receiving conveyor with a smaller mutual spacing, or the same mutual spacing as the spacing of the articles on the feeding conveyor, however, with the exception of the areas which are kept free from articles during the times of increased velocity of the receiving conveyor and the forward movement of the reversing roller device.

According to a preferred embodiment of the invention the method is characterized by using as the first velocity of the receiving conveyor the same velocity as the velocity of the feeding conveyor and by using as the increased velocity, a velocity which is twice as high as the first velocity. By means of this embodiment the articles will be positioned upon the receiving conveyor with approximately the same mutual spacing as the spacing between the articles on the feeding conveyor and the driving device to be used in carrying out the method will be very simple, i.e. due to the fact that the two conveyors may be driven with the same velocity and the adjustment to the higher velocity for the receiving conveyor may easily be carried out, viz. by pole exchanging of the motor driving the receiving conveyor.

The present invention also relates to an apparatus for carrying out the method and comprises a continuously moved endless feeding conveyor and a receiving conveyor, a reversing roller device being provided within the delivery end of the feeding conveyor and being reciprocable with respect to the receiving end of the receiving conveyor by means of a driving device in such a way that delivery from the feeding conveyor to the receiving conveyor may be interrupted during a period of time, the apparatus, moreover, comprising means for operating the receiving conveyor with changeable velocity and comprising means for driving the feeding conveyor. According to the present invention such apparatus is characterized by the driving means for the receiving conveyor being adjustable from a first lower velocity to a second higher velocity, the receiving conveyor, moreover, being provided with activating means for approximately simultaneous activating of control means for adjustment of the driving means for the receiving conveyor from the lower to the higher velocity, and of control means for starting the driving device for the reversing roller device, the apparatus, moreover, comprising control means for, after termination of the period of time during which delivery from the feeding conveyor is interrupted, causing adjustment of the velocity of the receiving conveyor to the lower velocity of the receiving conveyor and withdrawal of the reversing roller device.

Further advantageous features of the present invention become more apparent from the following description of a preferred embodiment of the apparatus.

DESCRIPTION OF THE PREFERRED EMBODIMENT

Figure 1:
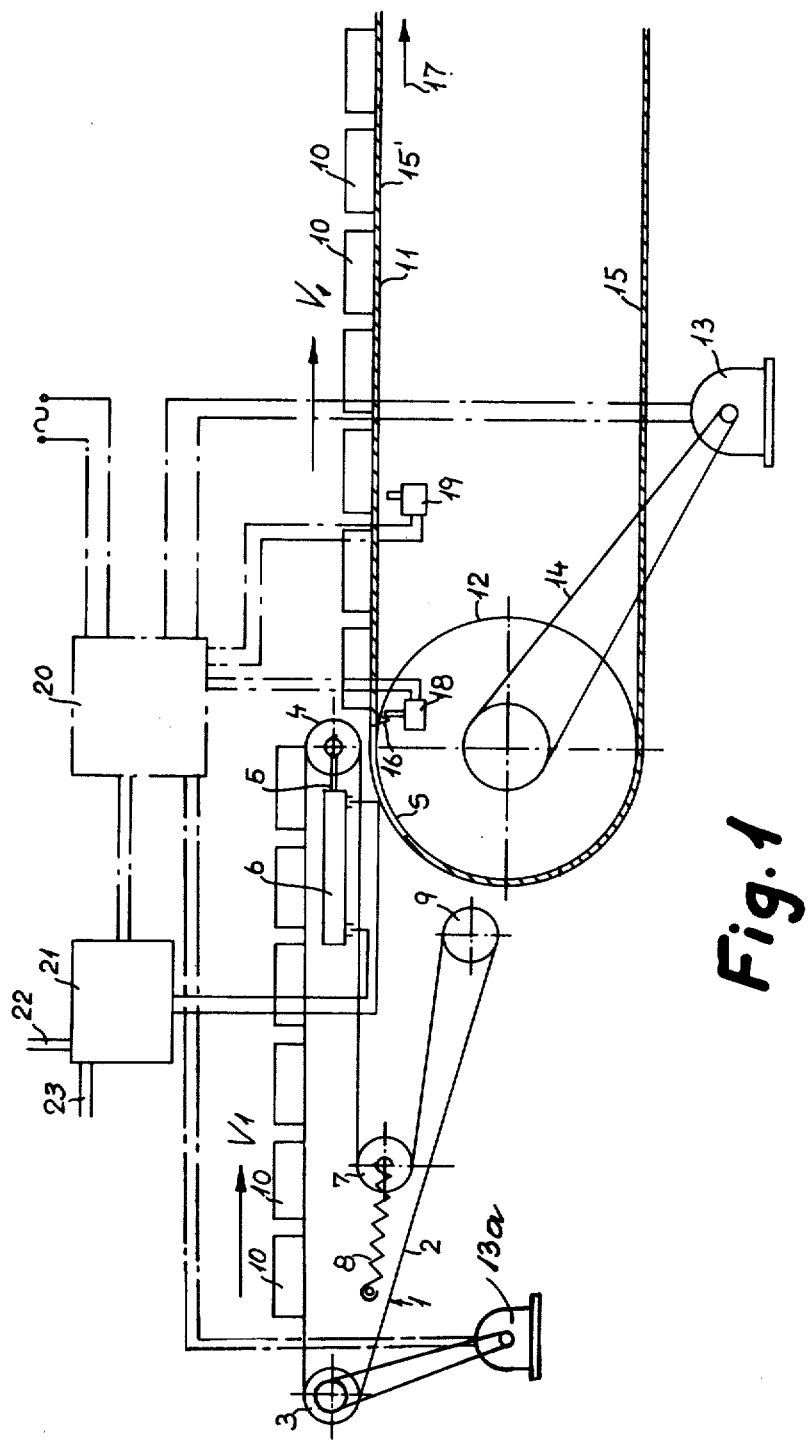
FIG. 1 schematically illustrates an embodiment of the apparatus according to the present invention, and FIG. 2 and FIG. 3 schematically show operational stages of the apparatus illustrated in FIG. 1.

As can be seen from FIG. 1, the feeding conveyor system 1 includes an endless conveyor consisting of a belt 2 passes around a rotatable roller 3 and then extends to a reversing roller 4, which is supported by the piston rod 5 of a pneumatic cylinder 6. From the reversing roller 4 the belt 2 extends to a tensioning roller 7, which is suspended by spring means 8, and from the roller 7 the belt passes on to a further roller 9. The roller 3 and accordingly also the belt 2 are, during the operation of the apparatus, continuously driven by means of a motor 13a. The belt 2 serves to support articles 10 deposited upon the belt 2 with mutual equal spacings in the longitudinal direction of the belt 2 by means of an apparatus (not shown) of any suitable kind.

The belt 2 serves as feeding conveyor for another conveyor 11 which extends around a roller 12, which is driven from a motor 13 via a chain 14. The conveyor 11 consists of sections 15, 15', each of which forms a carpet-like flexible carrier. The carriers 15, 15' are mutually connected for forming the belt 11, and the connecting areas between the carriers (of which only one is shown) are designated S. The connecting areas have a certain extension in the longitudinal direction of the belt 11 and by transferring articles 10 from the feeding conveyor 2 and to the receiving conveyor 11, it is desired to avoid depositing articles 10 on the areas S where the carpet or carrier sections 15, 15' are joined.

In order to avoid such depositing of articles 10 during each passage of an area S through the depositing area, the conveyor 11 is provided with a projecting activating boss 16 arranged immediately in front of each area S, and extending transversely to the direction of movement 17 (see FIG. 1) of the conveyor 11. The activating bosses 16 serve to activate two switching devices 18 and 19 which are connected to a control box 20 containing control means for controlling the motor 13 and the pneumatic cylinder-piston device 6, respectively, via a control device 21. The control device 21 is provided with an inlet 22 for pressurized air and a vent 23.

The apparatus illustrated operates in the following way.

Immediately before an activating boss 16 activates the switching device 18, the motor 13 drives the belt 11 with a velocity which is the same as the velocity of the feeding conveyor 1. This velocity is shown by the arrows $V_1$. The articles 10 are arranged with an appropriate mutual spacing upon the belt 2 and they will be deposited via the reversing roller 4 upon the receiving conveyor 11 with the same mutual spacing as they have on the feeding conveyor 1. However, nothing prevents the feeding conveyor 1 from being driven at a higher velocity than the receiving conveyor 11, but under such circumstances the articles 10 must be arranged upon the feeding conveyor 1 with a greater mutual spacing than the spacing finally desired on the receiving conveyor 11. In other words, the ratio of the velocity of the conveyor 1 to the velocity of the conveyor 11 is adjusted in such a way that the spacing desired is achieved when the articles 10 are transferred to the conveyor 11.

Figure 2:
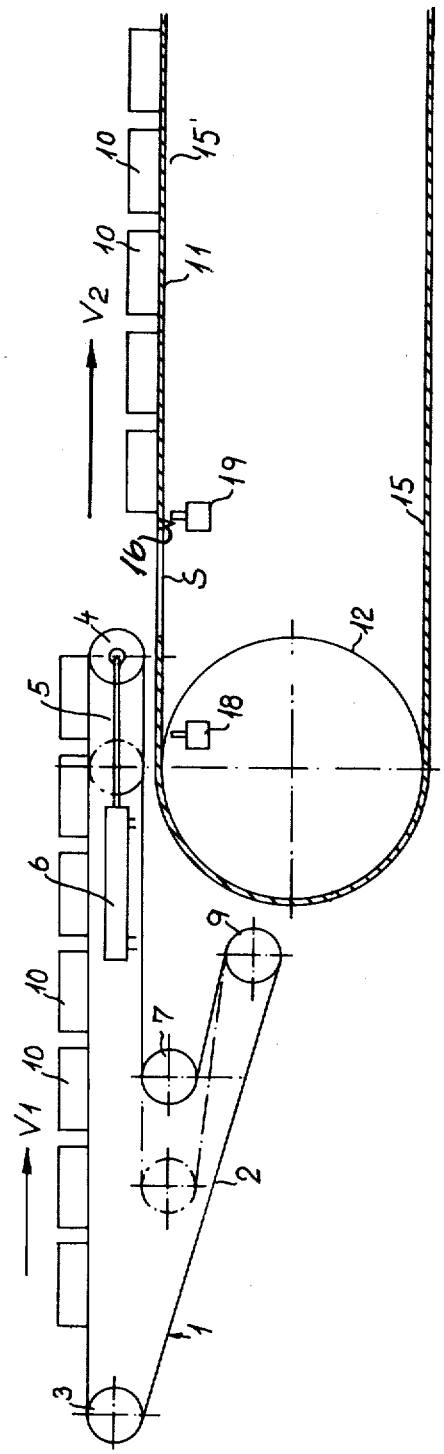

When an activating boss 16 activates the switching device 18, the motor 13 is adjusted by adjustment means of a kind known per se and arranged in the control box 20 in such a way that the velocity of the conveyor 11 is increased. Appropriately, the increased velocity may be selected to be twice as high as the velocity previously referred to, seeing that the increased velocity, under such circumstances, may be produced by a simple pole changing of the motor 13. Simultaneously with the activation of the switching device 18, the control box 20 delivers a signal to the control device 21 of the pneumatic cylinder device 6. The control device 21 starts, in response to the signal, the cylinder device 6 in such a way that the reversing roller 4 is moved to the right in FIG. 1 and such movement is carried out with a velocity which at least corresponds to the velocity with which the conveyor 1 is driven. By such movement, the articles 10 will maintain their position with respect to the reversing roller 4, or the articles will be displaced rearwardly with respect to the roller 4, and in both instances delivery of articles 10 from the conveyor 1 to the conveyor 11 will be interrupted. The velocity with which the reversing roller 4 is moved is simultaneously selected to be lower than the increased velocity of the conveyor 11 and, accordingly, the reversing roller 4 will not contact and push the articles 10 last delivered to the conveyor 11. A velocity of the reversing roller 4, controlled in this way, may easily be achieved in a way known per se by a suitable throttling of the air fed to the cylinder 6. The increased velocity of the conveyor 11, caused by the adjustment explained above, is so high that the conveyor 11 moves the distance S further than the distance the conveyor 1 moves the articles positioned thereon in the forward direction during the same period of time. It will be understood that when the reversing roller 4, during its movement, moves with the same velocity as the velocity of the feeding conveyor 1, the length of stroke of the piston rod 5 will correspond to the movement of the articles positioned upon the conveyor 1 during the stroke of the piston rod 5. Under such conditions it will, moreover, be understood that the conveyor 11 moves the distance S plus the length of stroke of the piston rod 5 while the conveyor 11 moves at the increased velocity. Accordingly, during the period of time the conveyor 11 moves at the increased velocity, the conveyor 11 will overtake the positioning of the foremost article on the conveyor 1 by a distance corresponding to the length of the area S. When such a position has been obtained, the boss 16 activates the switching device 19, cf. FIG. 2, in which only the switching devices 18 and 19 are illustrated for the sake of clarity whereas the other parts of the control devices have been omitted. By control means contained in the control box 20, the switching device 19 adjusts the motor 13 so that the motor 13 again will drive the conveyor 11 with the lower velocity previously mentioned. Simultaneously, the control box 20 delivers a signal to the control means 21 of the cylinder 6 whereby the cylinder 6 is adjusted so as to withdraw the reversing roller 4 to the position illustrated in FIG. 1. Thereby delivery of articles from the conveyor 1 to the conveyor 11 will be re-started so that the space S is maintained free from articles, e.g., as it appears from FIG. 3. By an appropriate throttling achieved the control means 21, the withdrawal of the reversing roller 4 is carried out slowly, viz. so that the reversing roller returns to the position shown in FIG. 1 before a further area S causes adjustment again of the motor 13 as well as activation of and the cylinder 6 as explained above. During the withdrawal of the reversing roller 4, articles 10 will be deposited upon the conveyor 11 with a spacing which is somewhat smaller than the spacing achieved when the reversing roller 4 is in the withdrawn position. However, such reduced spacing may be distributed over a high number of articles due to the long length of the sections 15, 15' forming the conveyor 11, and, accordingly, the reducing of the spacing may be made negligible.

During the reciprocation of the reversing roller 4, the spring means 8 will maintain an appropriate tensioning of the belt 2 of the conveyor 1 by means of the roller 7.

I claim:

1. Method of transferring articles from a continuously moved feeding conveyor and to a receiving conveyor whereby a reversing roller device, positioned at the delivery end of the feeding conveyor, is reciprocable with respect to the receiving end of the receiving conveyor, and whereby the forward movement of the reversing roller device is carried out at a velocity which is at least as great as the velocity of the feeding conveyor in such a way that the delivery of articles from the feeding conveyor is interrupted during a period of time and whereby the velocity of the receiving conveyor is changeable, characterized by driving the receiving conveyor during a period of time with a first velocity adjusted in such a way with respect to the velocity of the feeding conveyor that the articles are delivered to the receiving conveyor with a predetermined mutual distance whereafter the velocity of the receiving conveyor is increased approximately simultaneously with the initiation of the forward movement of the reversing roller device, said increased velocity of the receiving conveyor being so much higher than said first velocity, that the receiving conveyor, during the period of time wherein delivery of articles from the feeding conveyor is interrupted, is moved a distance which is greater than the total distance of forward movement carried out by the reversing roller device, said increased velocity simultaneously being higher than the velocity of the forward movement of the reversing roller device; reducing the velocity of the receiving conveyor to said first velocity after the termination of the period of time during which delivery of articles is interrupted and returning the reversing roller device to the starting position of said device before the next acceleration of the receiving conveyor is carried out.

2. Method according to claim 1, characterized by using as the first velocity of the receiving conveyor the same velocity as the velocity of the feeding conveyor and by using as said increased velocity, a velocity which is twice as high as said first velocity.

3. Apparatus for carrying out the method according to claim 1 and comprising a continuously moved endless feeding conveyor and a receiving conveyor, a reversing roller device being provided at the delivery end of the feeding conveyor and being reciprocable with respect to the receiving end of the receiving conveyor by means of a driving device in such a way that delivery from the feeding conveyor to the receiving conveyor may be interrupted during a period of time, said apparatus, moreover, comprising means for operating the receiving conveyor with changeable velocity and comprising means for driving the feeding conveyor, characterized by the operating means of the receiving conveyor being changeable between a first lower velocity and a second higher velocity, said receiving conveyor moreover being provided with activating means for approximately simultaneous activating of control means for changing over the operating means of the receiving conveyor from said lower to said higher velocity and of control means for starting the driving device of the reversing roller device, said apparatus, moreover, comprising control means for, after termination of the period of time during which delivery from the feeding conveyor is interrupted, to cause changing over of the velocity of the receiving conveyor to the lower velocity of the receiving conveyor and withdrawal of the reversing roller device.

* * * * *